United States Patent
Edpalm et al.

(10) Patent No.: US 10,636,263 B2
(45) Date of Patent: Apr. 28, 2020

(54) METHOD OF ENCODING AN IMAGE INCLUDING A PRIVACY MASK

(71) Applicant: Axis AB, Lund (SE)

(72) Inventors: Viktor Edpalm, Lund (SE); Song Yuan, Lund (SE); Xing Danielsson Fan, Lund (SE)

(73) Assignee: Axis AB, Lund (SE)

( * ) Notice: Subject to any disclaimer, the term of this patent is extended or adjusted under 35 U.S.C. 154(b) by 183 days.

(21) Appl. No.: 15/848,726

(22) Filed: Dec. 20, 2017

(65) Prior Publication Data
US 2018/0174414 A1 Jun. 21, 2018

(30) Foreign Application Priority Data
Dec. 20, 2016 (EP) .................................. 16205465

(51) Int. Cl.
*G06K 9/00* (2006.01)
*H04N 19/00* (2014.01)
(Continued)

(52) U.S. Cl.
CPC ... *G08B 13/19686* (2013.01); *G06K 9/00201* (2013.01); *G06K 9/00234* (2013.01);
(Continued)

(58) Field of Classification Search
CPC .......... G08B 13/19686; H04N 19/117; H04N 19/124; H04N 19/136; H04N 19/162;
(Continued)

(56) References Cited

U.S. PATENT DOCUMENTS

2001/0033695 A1* 10/2001 Okuno ................. H04N 19/563
                                                            382/233
2006/0206911 A1  9/2006 Kim et al.
(Continued)

FOREIGN PATENT DOCUMENTS

EP         3 021 583 A1    5/2016
JP        2014-225726 A   12/2014

OTHER PUBLICATIONS

"Semantic Video Analysis for Adaptive Content Delivery and Automatic Description", Cavallaro et al., IEEE Transactions on Circuits and Systems for Video Technology, IEEE Service Center, Piscataway, NJ, US, vol. 15, No. 10 (Oct. 1, 2005), pp. 1200-1209, XP011139779.

(Continued)

*Primary Examiner* — Ping Y Hsieh
(74) *Attorney, Agent, or Firm* — Volpe and Koenig, P.C.

(57) ABSTRACT

A method, system, and computer program product of encoding a digital image comprising a privacy mask. Information representative of pixels in the digital image is received. The pixels are grouped into encoding units. Information representative of a privacy mask area in which a privacy mask is to be applied on the image is also received. All encoding units that at least partially are located within the privacy mask area are identified, and the privacy mask area is extended to be aligned with the identified encoding units. For each encoding unit, a respective quantization parameter to be used for encoding the image is determined. The privacy mask is applied in the extended privacy mask area of the image, and the image with the applied privacy mask is encoded using the determined quantization parameters. The digital image encoding system may be included in a camera.

15 Claims, 5 Drawing Sheets

(51) Int. Cl.
*G08B 13/196* (2006.01)
*H04L 29/06* (2006.01)
*G06T 7/20* (2017.01)
*G06K 9/38* (2006.01)
*H04N 19/176* (2014.01)
*H04N 19/167* (2014.01)
*H04N 19/136* (2014.01)
*H04N 19/162* (2014.01)
*H04N 19/124* (2014.01)
*H04N 19/117* (2014.01)

(52) U.S. Cl.
CPC .................. *G06K 9/38* (2013.01); *G06T 7/20* (2013.01); *H04L 63/16* (2013.01); *H04N 19/117* (2014.11); *H04N 19/124* (2014.11); *H04N 19/136* (2014.11); *H04N 19/162* (2014.11); *H04N 19/167* (2014.11); *H04N 19/176* (2014.11); *H04L 2209/04* (2013.01)

(58) Field of Classification Search
CPC ............. H04N 19/167; G06K 9/00201; G06K 9/00234; G06K 9/38; G06T 7/20; H04L 63/16; H04L 2209/04
See application file for complete search history.

(56) References Cited

U.S. PATENT DOCUMENTS

| | | |
|---|---|---|
| 2008/0117295 A1 | 5/2008 | Ebrahimi et al. |
| 2009/0279798 A1* | 11/2009 | Massimino .......... H04N 19/176 382/235 |
| 2011/0085035 A1 | 4/2011 | Choi et al. |
| 2011/0194688 A1 | 8/2011 | Le Barz et al. |
| 2012/0236935 A1* | 9/2012 | Dutt ..................... H04N 19/176 375/240.03 |

OTHER PUBLICATIONS

EP 16205465.4 European Search Report (dated Jul. 18, 2017).

* cited by examiner

METHOD OF ENCODING AN IMAGE INCLUDING A PRIVACY MASK

FIELD OF INVENTION

The present teachings relate to encoding of digital images including privacy masks.

BACKGROUND

Monitoring cameras are used in many different applications, both in-doors and outdoors, for monitoring a variety of environments. Images depicting a captured scene may be monitored by, for example, an operator or a guard. In certain situations there may be a need to treat one part of a captured image differently from another part, such as when there is a need to mask part of an image in the interest of personal integrity. This may, for instance, occur when a camera is placed inside a building or inside a bus or a train and the environment outside is to be excluded from the monitoring done by the camera. Another example is when a building with windows is monitored and there is a need to avoid monitoring the inside of the building through the window.

In such instances, a privacy mask may be defined by an operator during set-up of the surveillance equipment. A privacy mask may be static or dynamic. A static privacy mask is usually created by an operator marking the area to be masked on the image in a graphical user interface. The static privacy mask then stays in place until the operator decides to move or remove it. A dynamic privacy mask may change over time. Similar to a dynamic privacy mask, the operator may mark an area in the image where masking is desired. The operator may also input settings determining when the privacy mask should be applied. For instance, the operator could draw a rectangle around a window in the image, and make settings such that if a face is detected within the marked area, that face will be masked out. Such dynamic privacy masks may be beneficial in that as long as the conditions set for the privacy mask are not fulfilled, there is no mask blocking the view, but as soon as, for example, a face detection algorithm, an object detection algorithm or a motion detection algorithm detects that the conditions are fulfilled, the privacy mask is applied. Privacy masks may be applied to the image as an overlay. Some privacy masks take the form of a black or otherwise colored, opaque area. Other privacy masks take the form of blurring, where image data is "smeared" out over the privacy mask area, or pixelization, where the image inside the privacy mask is divided into pixelization blocks and all pixels of a pixelization block are given the same value, such that the image appears blocky inside the privacy mask area. The privacy mask is in many cases a rectangle, or it may be another polygon, or have any other shape more closely following the shape of the area to occlude.

When a camera captures images, they are normally transmitted to a site of use, such as a control center, where they may be viewed and/or stored. They may also be stored in so called "edge storage", i.e. storage at the camera, either on board the camera, such as on an SD-card, or in connection with the camera, such as on a NAS (network attached storage). Be-fore transmission or edge storage, the images are encoded in order to save bandwidth and storage. Encoding may be performed in many different ways, for example, in accordance with the H.264 standard or other encoding standards. Most, if not all, video encoding is lossy, meaning that information present in the original images is lost during encoding and cannot be regained in decoding. There is a trade-off between reduction of the number of bits required for representing the original images and the resulting image quality. Efforts have been made to develop encoding schemes that make as efficient use of the available bits as possible.

Most video compression standards have originally been developed for use in broadcasting and cinematography, but they are used also in other are-as where requirements are different. One such area is monitoring or surveil-lance, and efforts have been made to optimize encoding for monitoring or surveillance uses. An example of an encoding method which is particularly useful in monitoring applications is disclosed in applicant's EP 3 021 583. Although this encoding method enables significant efficiency improvements, there still remains a desire to further improve encoding. For instance, in images comprising a privacy mask, bits might not always be spent on the most important images or the most important parts of the images. There may also be visual artefacts in the encoded and decoded images.

SUMMARY

It is an object of the disclosure to provide a method of encoding digital images comprising a privacy mask which enables efficient use of available bandwidth and storage.

Another object is to provide a method of encoding digital images comprising a privacy mask which reduces annoying visual artefacts.

A further object is to provide a method of encoding digital images comprising a privacy mask which makes it possible to ensure that image information that should be occluded by the privacy mask is not accessible.

It is also an object of the disclosure to provide a digital image encoding system for encoding a digital image comprising a privacy mask which is capable of using available bits efficiently for representing the images.

An object of the disclosure is also to provide a digital image encoding system for encoding a digital image comprising a privacy mask which makes it possible to reduce visual artefacts in encoded and decoded images.

An additional object is to provide a digital image encoding system for encoding a digital image comprising a privacy mask which enables improved security in regards to the protection afforded by the privacy mask.

According to a first aspect, these and other objects are achieved, in full or at least in part, by a method of encoding a digital image comprising a privacy mask, the method comprising: receiving information representative of pixels in the digital image, grouping the pixels of the image into encoding units of groups of neighboring pixels, receiving information representative of a privacy mask area in which a privacy mask is to be applied on the image, identifying all encoding units that at least partially are located within the privacy mask area, extending the privacy mask area to be aligned with the identified encoding units, for each encoding unit, determining a respective quantization parameter to be used for encoding the image, applying the privacy mask in the extended privacy mask area of the image, and encoding the image with the applied privacy mask using the determined quantization parameters. In this manner, it is possible to ensure that all of the image data to be blocked by the privacy mask can be encoded in a suitable way. It is, for instance, possible to set one quantization parameter for the area covered by the privacy mask, and another quantization parameter for the rest of the image. It is also possible to ensure that image data in parts of blocks that would initially be only partially within the privacy mask area does not give unintentional access to information that is supposed to be blocked by the privacy mask. This could, at least theoretically, happen in encoding schemes where the determination of the quantization parameter for an encoding unit is made based on an image analysis or image statistics. If the quantization parameter for an encoding unit partially inside and partially outside the initial privacy mask area were to be based on an analysis of image data in that encoding unit, image data that would in itself be covered by the initial privacy mask would influence the encoding of the image data in the same encoding unit that would be outside the initial privacy mask, such that some information regarding the image data that was supposed to be protected by the privacy mask could be gained through reverse engineering of the quantization parameters. Additionally, drastic quality changes at the border of the privacy mask may be avoided, leading to reduced visual artefacts.

According to a variant of the inventive method, a predetermined encoding parameter is used for encoding the identified encoding units, the predetermined encoding parameter being at least one of a predetermined encoding unit size and a predetermined quantization parameter. By enforcing a predetermined encoding unit size or quantization parameter it may be ensured that no information about the image data to be blocked by the privacy mask may be accessed by a study of the spatial pattern of encoding unit sizes or quantization parameters within the masked area.

The step of determining a respective quantization parameter to be used for encoding the image may comprise setting the quantization parameters of the identified encoding units to a predetermined reduced quality quantization parameter. This makes it possible to reduce the number of bits used for encoding the part of the image that is covered by the privacy mask. Otherwise, if the determination of the quantization parameters were performed as usual, without regard to the privacy mask, the part of the image covered by the privacy mask could be encoded with a high quality that would be of no value to the user. Instead, by reducing the quality of the part of the image that is covered by the privacy mask, bits may be saved for use in other, more interesting parts of the image that are of actual use for monitoring purposes.

The pixels in the identified encoding units may be grouped or regrouped into modified encoding units of a predetermined large size. Generally, less bits are needed for encoding a given part of an image using large encoding units than for encoding the same part using small encoding units. More information may be lost by using larger encoding units, but for the privacy mask, this is of no concern, as there is no image data of interest to show there. There are encoding schemes in which the size of the encoding units is determined based on an analysis of image data. In such schemes, information could, at least theoretically, leak out from under the privacy mask by reverse engineering of a spatial pattern of the encoding unit sizes within the privacy mask area. By setting a predetermined encoding unit size for grouping the pixels within the extended privacy mask area, this risk is avoided.

The privacy mask may comprise at least one of a uniform color, a blurring, and a pixelization.

According to a variant of the method, the privacy mask comprises a pixelization in which pixels within the privacy mask area are grouped into pixelization groups of neighboring pixels, and wherein a pixel value of each pixel of a respective pixelization group is set to a common pixel value representative of the respective pixelization group, the method further comprising: grouping the pixels of the image within the privacy mask area into encoding units corresponding to the pixelization groups. Such a method makes it possible to avoid annoying visual artefacts caused by quality differences at the border of the privacy mask. It also improves security by making it possible to ensure that the encoding units do not form a spatial pattern different from the pixelization that could be used for deriving information about image data that should be covered by the privacy mask.

The step of determining a respective quantization parameter to be used for encoding the image may comprise: setting a quantization parameter for each encoding unit based on an identification of relevant areas in the image, such that encoding units in relevant areas are given a first quantization parameter, and encoding units in not relevant areas are given a second quantization parameter, the first quantization parameter being representative of a compression giving a higher image quality than the second quantization parameter. Using such an approach for determining the quantization parameters, it is possible to make an efficient use of available bandwidth and storage. It is possible to keep a number of bits used for representing not relevant areas of an image down, while allowing high quality representation of relevant areas of the image.

The step of determining a respective quantization parameter to be used for encoding the image may further comprise: calculating a spatial statistical measure of the information representative of the pixels for each encoding unit to form a group value for each encoding unit, calculating differences between group values, comparing the differences to a threshold value, if the difference is equal to or above the threshold value, identifying the encoding unit as being in a relevant area of the image, and if the difference is below the threshold, identifying the encoding unit as being in a not relevant area of the image. This may provide an efficient way of identifying relevant and not relevant areas in the image.

The spatial statistical measure may be at least one from the group consisting of a sum, a mean, a median, an interquartile range, a standard deviation, a variance, a skewness and a kurtosis of the information.

Each encoding unit may include at least 256 pixels. This size may correspond to the size of human faces, which may in many monitoring use cases be seen as relevant parts of the image.

The information representative of the pixels in the image may be at least one from the group consisting of data on luminance, light intensity, and color values.

According to a second aspect, these and other objects are achieved, in full or at least in part, by a digital image encoding system for encoding a digital image comprising a privacy mask, the system comprising: a receiving module arranged to receive information representative of pixels in the digital image and to group the pixels of the image into encoding units of groups of neighboring pixels, a privacy mask input module arranged to receive information representative of a privacy mask area in which a privacy mask is to be applied on the image, an adaptation module arranged to identify all encoding units that at least partially are located within the privacy mask area and to extend the privacy mask area to be aligned with the identified coding units, a compression determination module arranged to determine a respective quantization parameter for each encoding unit to be used for encoding the image, a privacy mask application module arranged to apply the privacy mask in the extended privacy mask area of the image, and an encoder module arranged to encode the image with the applied privacy mask using the determined quantization parameters. Using such an encoding system, it is possible to ensure efficient use of bandwidth and storage. It is also possible to avoid "leakage" of information on image data intended to be blocked by the privacy mask through non-masked parts of encoding units partially covered by the initial privacy mask. The encoding system of the second aspect may generally be embodied in the same ways as the method of the first aspect, with accompanying advantages.

In an embodiment, the privacy mask input module is arranged to receive information on a pixelization in which pixels within the privacy mask area are grouped into pixelization groups of neighboring pixels, the receiving module is arranged to group the pixels of the image within the privacy mask area into encoding units corresponding to the pixelization groups, and the privacy mask application module is arranged to set a pixel value of each pixel of a respective pixelization group to a common pixel value representative of the respective pixelization group. In this manner, it may be ensured that annoying visual artefacts at the border of the privacy mask are avoided. Improved security may also be ensured as discussed above in relation to the method of the first aspect.

The compression determination module may be arranged to set a quantization parameter for each encoding unit based on an identification of relevant areas in the image, such that encoding units in relevant areas are given a first quantization parameter, and encoding units in not relevant areas are given a second quantization parameter, the first quantization parameter being representative of a compression giving a higher image quality than the second quantization parameter. The encoding system may thereby make efficient use of available bits.

The compression determination module of the encoding system may be arranged to calculate a spatial statistical measure of the information representative of the pixels for each encoding unit to form a group value for each encoding unit, calculate differences between group values, compare the differences to a threshold value, if the difference is equal to or above the threshold value, identify the encoding unit as being in a relevant area of the image, and if the difference is below the threshold, identify the encoding unit as being in a not relevant area of the image. In this way, the encoding system may ensure that bits are spent wisely in view of the needs in a monitoring use case.

According to a third aspect, these and other objects are achieved, in full or at least in part, by a camera comprising a digital encoding system ac-cording to the second aspect.

According to a fourth aspect, these and other objects are achieved, in full or at least in part, by a computer program product comprising a computer-readable storage medium with instructions adapted to carry out the method according to the first aspect when executed by a processor.

A further scope of applicability of the present disclosure will become apparent from the detailed description given below. However, it should be understood that the detailed description and specific examples, while indicating embodiments, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where.

DETAILED DESCRIPTION

Figure 1:
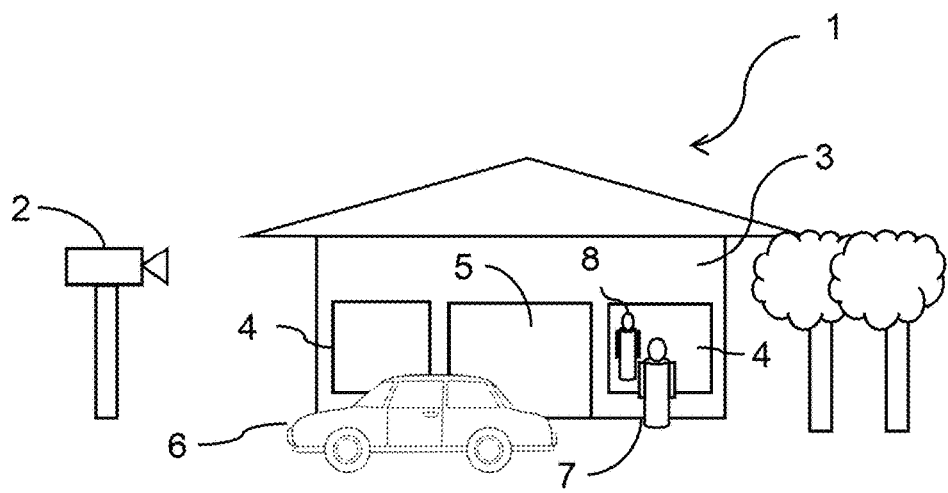
FIG. 1 is a perspective view of a scene monitored by a camera.

In FIG. 1, a scene 1 is shown, which is monitored by a camera 2. In the scene 1, there is a house 3 with windows 4 and a doorway 5. A car 6 is parked in front of the house, and a first person 7 is standing outside the house. A second person 8 is in the house, visible through one of the windows 4.

Figure 2:
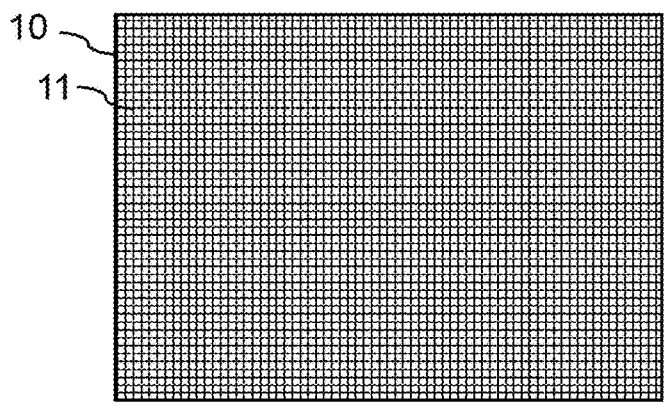
FIG. 2 is an illustration of a digital image.

The camera 2 captures images of the scene. In FIG. 2, the principal structure of an image 10 is shown. The image 10 is made up of a number of pixels 11, corresponding to the pixels of an image sensor (not shown) of the camera 2. The image may, for instance, be made up of 1280×720 pixels, 1920×1080 pixels, or 3840×2160 pixels.

Figure 3:
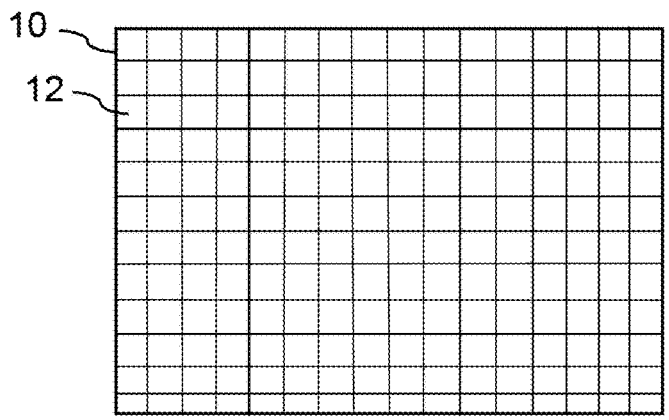
FIG. 3 is an illustration of the digital image of FIG. 2, with pixels grouped into encoding units.

As shown in FIG. 3, the pixels 11 of the image 10 may be grouped into encoding units 12 of neighboring pixels 11. The encoding units 12 may also be referred to as macroblocks, pixel blocks, coding tree units, or coding units. The encoding units 12 may in most cases be square, comprised of, for example, 8×8, 16×16, or 32×32 pixels. It is also possible to group the pixels 11 into encoding units of other sizes and shapes.

Figure 4:
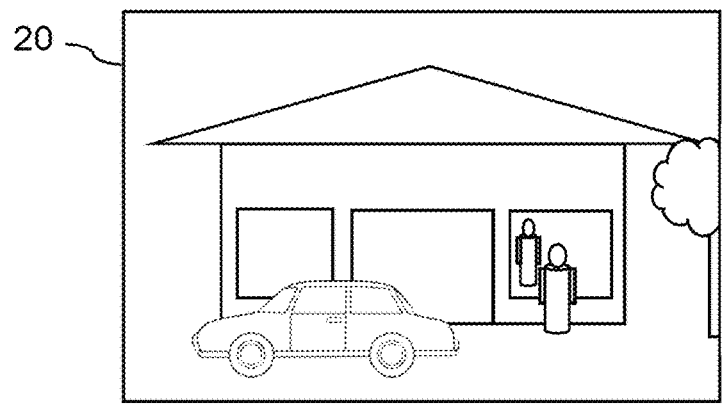
FIG. 4 is an illustration of an image of the scene of FIG. 1.
Figure 5:
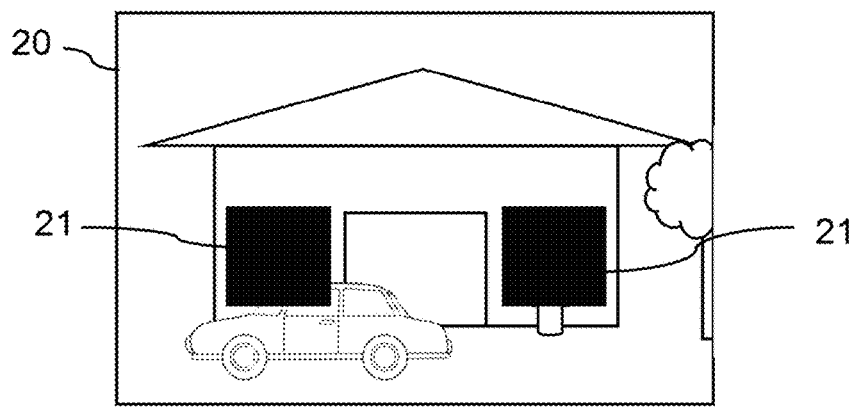
FIG. 5 is an illustration of the image of FIG. 4 with a privacy mask applied.

FIG. 4 shows an image 20 captured by the camera 2. It may be seen that in the image 20, the second person 8 inside the house is visible through the window. The purpose of monitoring the scene 1 may be to keep track of what happens outside the house 3, and not what happens inside the house 3. It may therefore be desirable to mask out those parts of the image 20 that show the inside of the house 3. As illustrated in FIG. 5, a user of the camera 2 may specify privacy mask areas 21 in which image data is to be blocked. In FIG. 5, the privacy masks 21 are simply black rectangles. Image data behind the privacy masks 21 will thus not be seen by an operator watching footage from the scene 1.

Figures 6A, 6B, 6C:
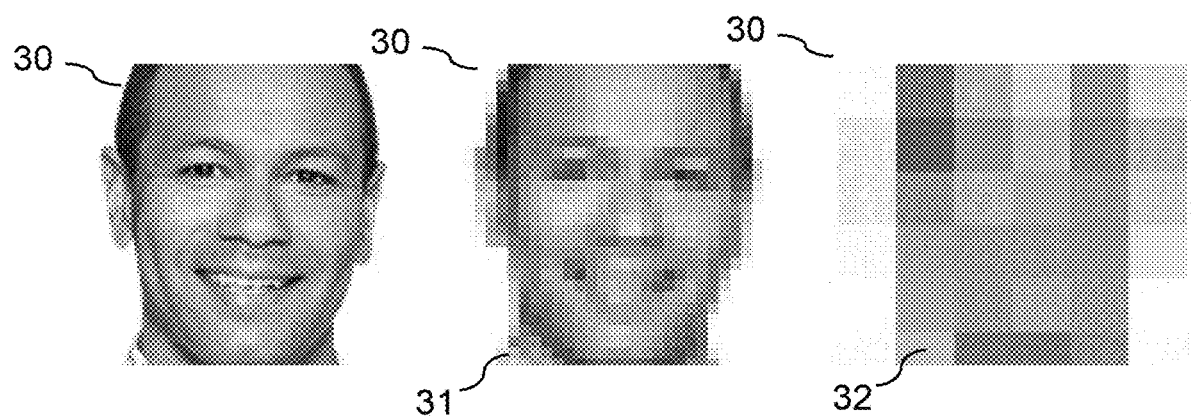
FIG. 6 a-c show an image and different pixelizations.

It should be noted that the privacy masks 21 may also take other forms. For instance, instead of just overlaying a black rectangle on the image, a pixelized privacy mask may be used. In FIG. 6a, an image of a human face is shown. This face may be part of an image of a scene in which it is desirable to mask out the face, such that the person appearing in the scene cannot be identified. A pixelization is done in FIG. 6b, in which pixels in the image are grouped into pixelization groups 31. For each pixelization group 31, all pixels in the pixelization group 31 are set to one common value which is representative of the pixels in that pixelization group 31. For instance, an average of all the pixel values in the pixelization group 31 may be used as the common value. There are also variations of pixelization in which the value of one single pixel in the group is used as the common value for all pixels in the same pixelization group, and variations in which an average of a subset of the pixels in the pixelization group is used as the common value.

As may be seen in FIG. 6b, it is still possible to detect that there is a face in the image 30. To someone who knows the person in the image, it may even be possible to recognize him. FIG. 6c shows an example in which pixelization groups 32 of larger size are used. In the same way as in FIG. 6b, a common pixel value is set for all pixels in a pixelization group 32, but since the pixelization groups are larger, less information is left in the masked area, making it hard to even tell that there is a face. The size of the pixelization groups may be chosen depending on factors such as the size of the image, the distance to the objects that are to be masked out, and the degree to which the objects are to be made unidentifiable.

Figure 7:
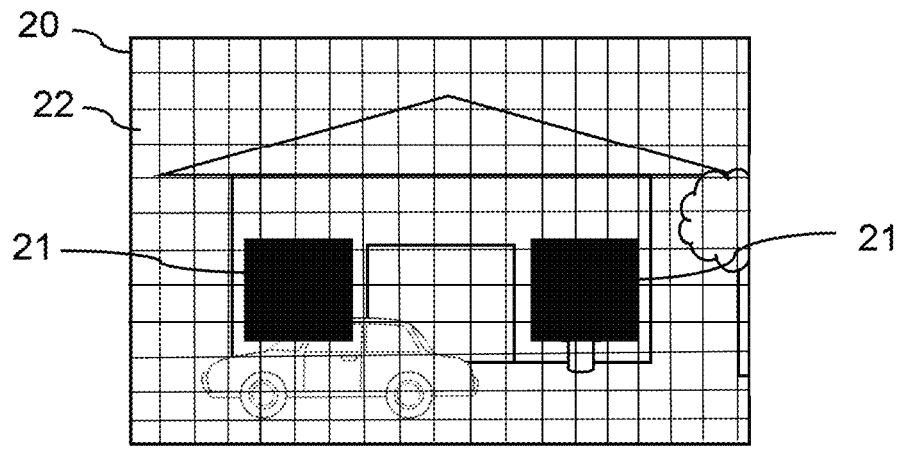
FIG. 7 is an illustration of the image of FIG. 5 also showing encoding units into which the pixels of the image have been grouped.

In FIG. 7, the image 20 is once more shown, but now also schematically showing encoding units 22 into which the pixels of the image 20 have been grouped. It may here be seen that the privacy masks 21 each cover a number of encoding units 22 fully, and that they also cover a number of encoding units 22 partially. All the encoding units 22 that are at least partially covered by the privacy masks 21 have been marked with a dotted pattern in FIG. 8, and will be referred to as identified encoding units 23. For the sake of clarity, it is pointed out that even though the dotted pattern cannot be seen on top of the black rectangle, also the encoding units that are fully covered by the privacy mask 21 are included in the identified encoding units 23.

Figure 8:
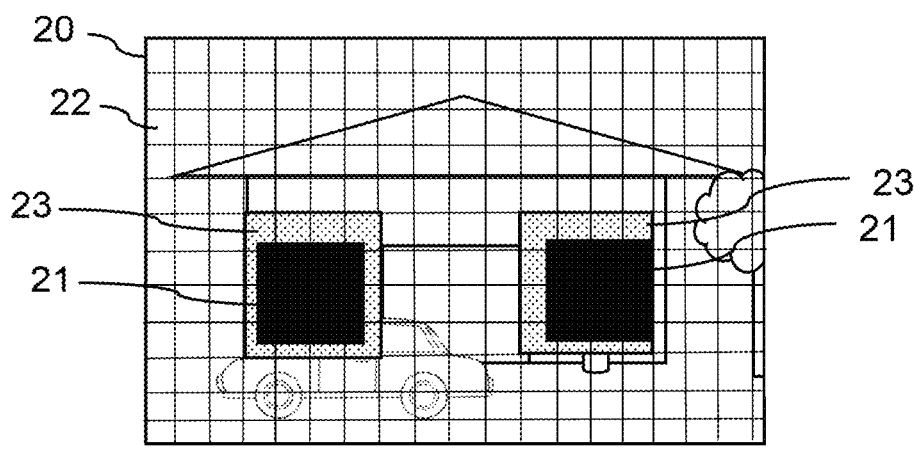
FIG. 8 is an illustration of the image of FIGS. 5 and 7 showing identified encoding units.

The initial privacy mask area 21, which was shown in FIGS. 7 and 8, is extended to be aligned with the identified encoding units 23, now forming an extended privacy mask area 24. Thus, all encoding units 22 that were at least partially within the initial privacy mask area 21, i.e. the identified encoding units 23, are covered by the extended privacy mask 24. It may thereby be ensured that image data outside the initial privacy mask 21, but in the identified encoding units 23 does not inadvertently give access to image data inside the initial privacy mask area 21. In other words, "leakage" of information from under the privacy mask is prevented. This could otherwise happen if encoding of the partially covered encoding units is based at least partly on information residing within the privacy mask area 21.

The extension of the privacy mask in FIG. 6 may seem rather drastic, but it should be noted that the encoding units 22 are schematic. In the interest of clarity of the drawings, the pixels and encoding units are exaggerated in size. If, for instance, an image frame of 1920×1080 pixels were to be divided into encoding units of 16×16 pixels, there would be 120×68 encoding units, and showing all of those would make for cluttered drawings.

For encoding the image 20 with the extended privacy mask 24, a quantization parameter is determined for each encoding unit 22 in the image 20. In some applications, it may only be possible to set one quantization parameter for the entire image, thus giving each encoding unit 22 the same quantization parameter. The quantization parameter may be set by user input or determined otherwise, for example, based on motion in images in a video sequence. It is, however, in many cases advantageous to be able to set different quantization parameters for different parts of the image, even down to individual encoding units. In some encoding schemes, it is possible to set one or more regions of interest, often referred to with the acronym ROI, in which image data should be less compressed than in the rest of the image. With the scene 1 shown in FIG. 1 as an example, the user may set an ROI that covers the house 3 in the area in front of it. It may also be possible to set regions that are not interesting. For example, the user may not be interested in the sky above the house 3, and may therefore determine that the area of the image that shows the sky is to be more compressed than the rest of the image.

Efforts have also been made to further improve on such ROI based encoding methods, such that the ROIs are dynamic. One such method is disclosed in applicant's EP 3 021 583, which is incorporated herein by reference. According to this method, relevant and not relevant areas of an image are determined by studying block statistics of pixels in the image. A spatial statistical measure is determined for each group of neighboring pixels in the image to form a group value for each group of pixels. Group values are compared to each other, and if the group value of one group is sufficiently different from neighboring groups, that group is determined to be in a relevant area of the image. With such a dynamic ROI, it is possible to get good image quality in areas of an image where there are interesting details, and to spend less bits on areas of the image which do not contain details of interest. For instance, in a monitoring situation, human faces may be considered relevant, whereas the small details in a lawn may be considered not relevant. The groups of neighboring pixels for which group values are calculated may or may not be the same as the encoding units 22. For instance, the groups of pixels used for identifying relevant and not relevant areas of the image may be larger than the encoding units 22, such that, for example, a group of 32×32 pixels includes four encoding units each being made up of 16×16 pixels. When a quantization parameter is determined for a group of neighboring pixels based on the identification of relevant and not relevant areas of the image, that quantization parameter is applied for all encoding units in that group of neighboring pixels.

In order to make good use of available bandwidth and/or storage, ac-cording to a variant of the method, the quantization parameter may be set differently for parts of the image 20 outside the extended privacy mask 24 from parts of the image 20 inside the extended privacy mask 24. More particularly, the quantization parameter may be set high, implying high compression and hence a low image quality of the decoded image frames, for the identified encoding units 23. There may very well be a lot of details in the part of the image that is to be covered by the privacy mask, and depending on the method by which quantization parameters are determined, that may lead to low quantization parameters for that part of the image, implying low compression and high image quality of the decoded image frames.

However, once the privacy mask is applied to the image, there is not much point in having high image quality in areas covered by privacy masks, as there is just the privacy mask to see, and no relevant image data. By setting a quantization parameter representative of a low image quality for the identified encoding units 23, i.e. the encoding units covered by the extended privacy mask 24, bits can be saved and may be put to better use in other parts of the image 20, in other images in the video sequence, or in images from other cameras in the same monitoring system. For instance, in a codec in which quantization parameters of 0-51 can be set, and where 0 implies the least compression and 51 implies the most severe compression, a quantization parameter of 51 may be set for the identified encoding units 23.

Similarly, the pixels in the identified encoding units may be grouped or regrouped into encoding units of a predetermined encoding unit size. As an example, a codec may use encoding unit sizes, or macroblock sizes, or coding tree unit sizes, in a range from 8×8 pixels up to 64×64 pixels. A predetermined encoding unit size of 64×64 pixels may here be used for the pixels in the identified encoding units 23, i.e. the pixels that are covered by the ex-tended privacy mask 24.

It may here be noted, that prior art privacy masking methods exist, in which encoding units are inherently aligned with the privacy mask, because the privacy mask is applied by the encoder. In such methods, the privacy mask is applied by compressing the area to be masked severely. Thereby, information is lost to such high extent in the privacy mask area that the image data is sufficiently blocked for the viewer. Such methods are completely dependent on how the encoder is implemented, and it is therefore not possible to control the appearance of the privacy mask. The same intended privacy mask will also be applied differently in different encoders, which may be undesirable if the same video sequence of image frames is to be sent to different encoders at the same time. In regard to security, such methods may also be less reliable, since all image data is actually provided to the encoder, also in the area to be masked. It may therefore be possible to extract information from under the privacy mask.

Figure 9:
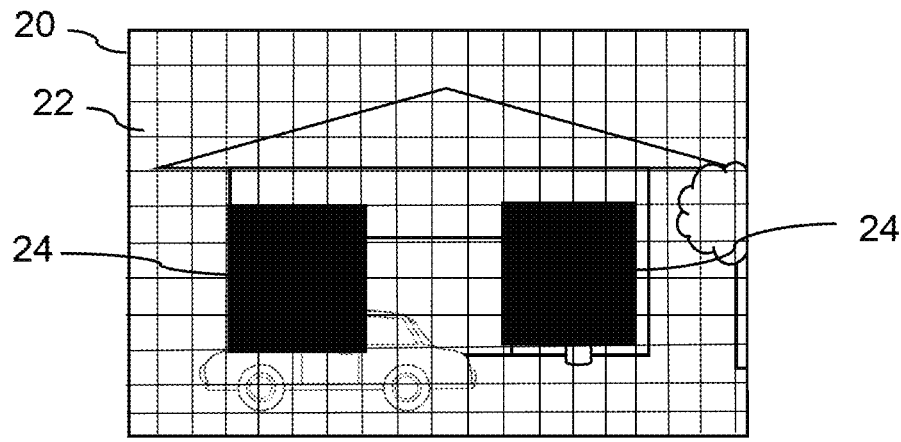
FIG. 9 is an illustration of the image of FIG. 7 with the privacy mask area extended.

In FIGS. 7 9, the privacy masks 21 are just black rectangles. As already mentioned, privacy masks may also be in the form of a pixelization, such as shown in FIGS. 6a c. With a pixelized privacy mask, the method described above may be developed further. As before, the initial privacy mask 21 is ex-tended to be aligned with those identified encoding units 23 that are at least partially covered by the initial privacy mask 21, thereby forming the extended privacy mask 24. Within the extended privacy mask area 24, the pixels of the image may be grouped or regrouped to correspond to the size of the pixelization groups 31, 32. Assuming, for instance, that the image 20 was initially grouped into encoding units of 16×16 pixels, and that the size set for the pixelization groups is 32×32 pixels, it may be seen that there is a mismatch in pixel group size. Within the extended privacy mask area 24, the encoding units may therefore be grouped into encoding units 22 of the same size as the pixelization groups 31, 32, such that each pixelization group 31, 32 corresponds to one encoding unit 22. Hereby, annoying visual artefacts caused by misalignment of encoding units and pixelization groups may be avoided. Such an alignment of the encoding units and the pixelization groups could also be done without actually extending the privacy mask. However, in that way, depending on how quantization parameters are determined, there could still be a leakage of information from under the privacy mask through the visible parts of the partially covered encoding units.

Figure 10:
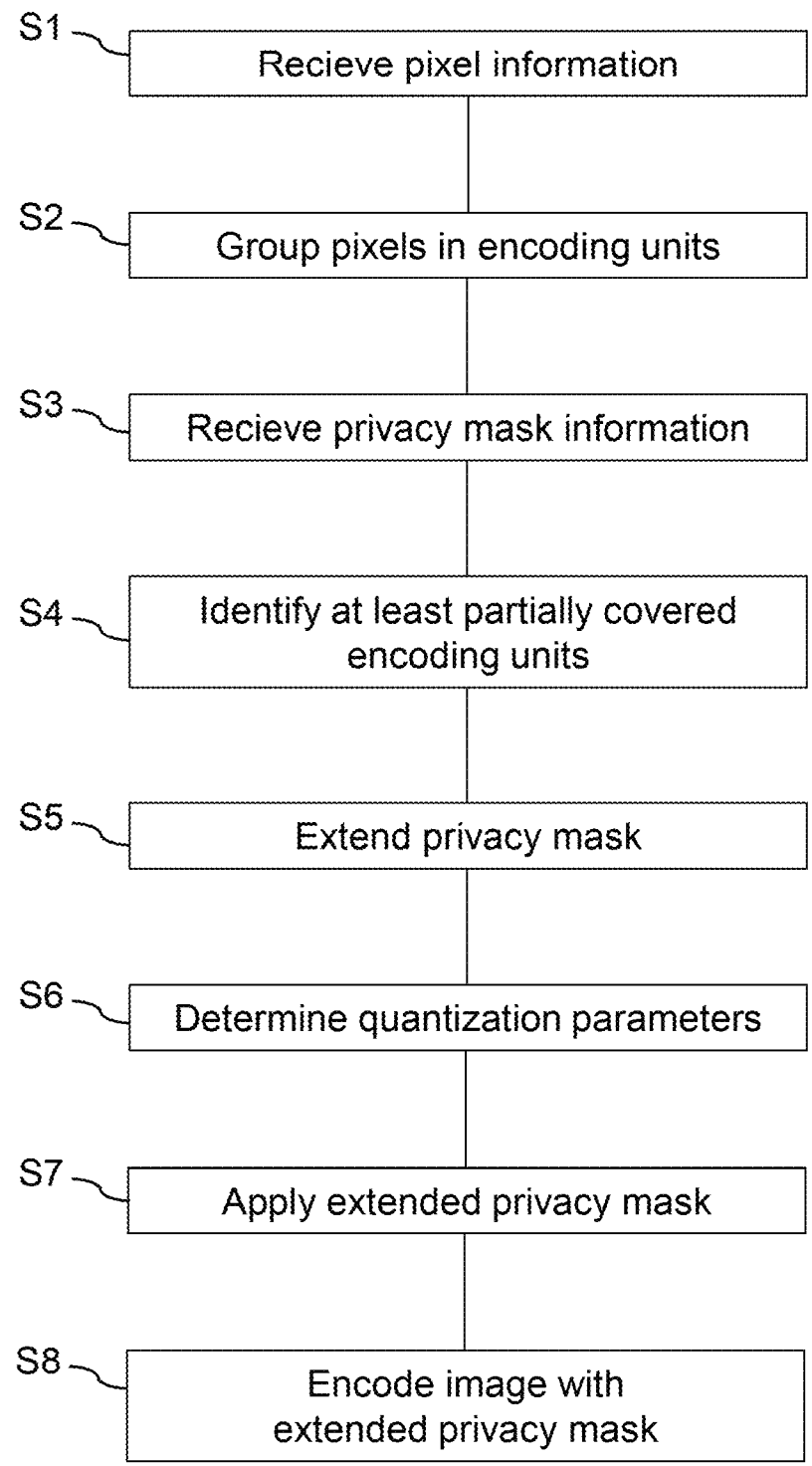
FIG. 10 is a flow chart illustrating a variant of the inventive method.

The methods described above will now be summarized more briefly with reference to FIG. 10, which is a flow chart of a variant of the inventive method.

Information representative of the pixels in the image are received (step S1). The pixels are grouped into encoding units of neighboring pixels (S2). Information is also received which is representative of a privacy mask to be applied to the image (S3). Those encoding units in the image that will at least partially be covered by the privacy mask, i.e. are at least partially within the privacy mask area, are identified (S4). The privacy mask is extended to cover the identified encoding units, such that it covers an extended privacy mask area (S5). For each encoding unit in the image, a quantization parameter is determined (S6). The extended privacy mask is applied to the image (S7), and the image is encoded with the privacy mask using the determined quantization parameters (S8). The same procedure may then be used for subsequent images in a video sequence.

Figure 11:
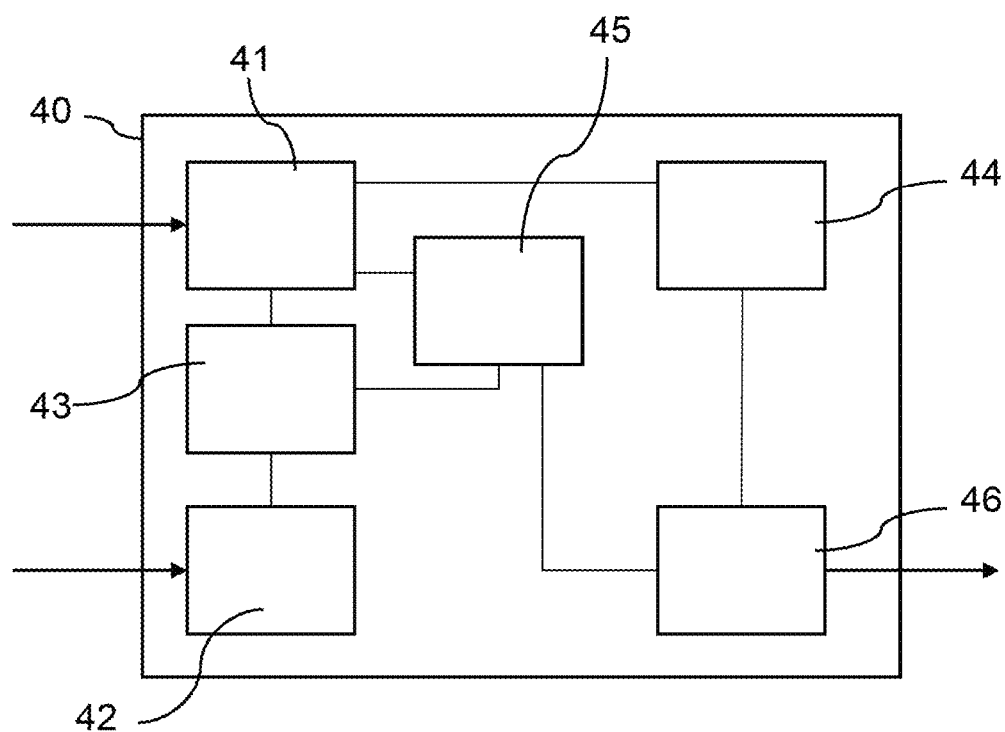
FIG. 11 is a block diagram of an encoding system according to an embodiment.

FIG. 11 is a simplified block diagram of an encoding system 40 which may be operated in accordance with the methods described above. The encoding system 40 comprises a receiving module 41, which is arranged to receive the information representative of the pixels in the image to encode. As noted before, this information may, for instance be at least one of data on luminance, light intensity, and color values. The receiving module is also arranged to group the pixels into encoding units of groups of neighboring pixels. The encoding units may also be referred to as macroblocks or pixel blocks.

The encoding system 40 also has a privacy mask input module 42 for receiving information representative of the privacy mask area in which the privacy mask is to be applied to the image. It should be noted that more than one privacy mask may be applied to the same image, and that they may be of the same or different type, shape and size. For instance, one privacy mask may be a black rectangle, and another privacy mask may be a pixelized square. The privacy mask information may be input in any suitable way, such as by a user drawing a box on a displayed image of the monitored scene. As discussed in the background section, the privacy mask information may also stem from, for example, a face detector, an object detector, or a motion detector which may be used for determining if conditions set by the user have been met.

Further, the encoding system 40 has an adaptation module 43 for identifying all encoding units that are at least partially located within the privacy mask area and for extending the privacy mask area to be aligned with the identified encoding units. In this way, the adaptation module may ensure that no encoding units are partially accessible to a viewer whilst partially covered by the privacy mask.

A compression determination module 44 is comprised in the encoding system 40 for determining a respective quantization parameter for each encoding unit. This determination may be performed in one of various known or possibly inventive ways.

The encoding system 40 also comprises a privacy mask application module 45, which is arranged to apply the privacy mask in the extended privacy mask area.

Additionally, the encoding system 40 has an encoder module 46 for performing the actual encoding of the image with the applied privacy mask using the determined quantization parameters. Thus, the encoding system 40 is capable of encoding an image with an extended privacy mask, such that leakage of information from under the privacy mask may be avoided and visual artefacts may be reduced.

In line with the variant of the method described above, the compression determination module 44 may operate in accordance with a dynamic ROI method, such as the one disclosed in EP 3 021 583.

Figure 12:
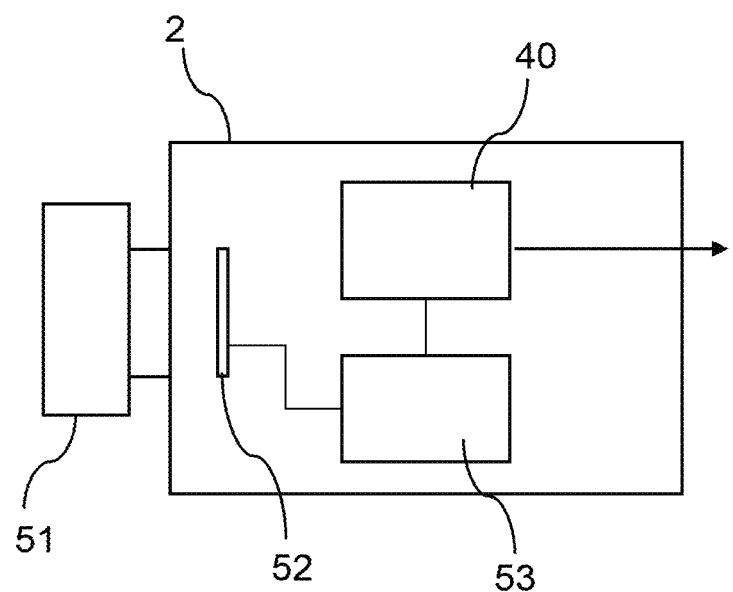
FIG. 12 is a block diagram of a camera according to an embodiment.

In FIG. 12, a block diagram of the camera 1 is shown. The camera 1 comprises optics 51 and an image sensor 52, as is generally known per se. The camera 1 also includes the encoding system 40 described above, and an image processing module 53, which may also be referred to as an image processing pipeline. The image processing module may, for example perform processes such as demosaicing, noise filtering, sharpening, and tone mapping. As the skilled person realizes, the camera will have additional components, but as they are not necessary for the understating of the present teachings, they are not shown in FIG. 12 and will not be further discussed.

It will be appreciated that a person skilled in the art can modify the above described embodiments in many ways and still use the advantages of the disclosure as shown in the embodiments above. As an example, the quantization parameters may be determined in any desired way. They may be set statically for the entre image, or they may be determined in more elaborate ways, such as based on image analysis or image statistics.

The privacy mask may take different forms, and may, for example, be black or otherwise colored areas of rectangular or other shape. They may be pixelated as discussed in further detail above, or they may be blurred or smeared by replacing the pixel value of each pixel with an average of pixel values in a neighborhood of the pixel in question, i.e. applying a rather heavy-handed noise filter. Both pixelization and smearing are sometimes referred to as blur-ring.

Depending on how different encoding units of an image are encoded, the encoded and decoded image may appear blocky. For instance, if one encoding unit or macroblock is coded in intra mode (as an I-block) and an adjacent encoding unit or macroblock is encoded in inter mode (as a P-block or B-block), the border there between may be conspicuous. Therefore, many encoders apply a deblocking filter that may smooth out differences across the border between encoding units. This may be done by forming an average of a few pixel values on both sides of the border and replacing the values of the pixels near the border by the average value. In order to further ensure that no image data may leak out from under the privacy mask, such a deblocking filter may be turned off for the masked encoding units, i.e. the identified coding units 23.

It should be noted that the order in which the steps of the method have been described above is not critical. For instance, quantization parameters may first be set for all encoding units in the image, without regard to the privacy mask, and the quantization parameters may then be overridden in the identified encoding units. It would also be possible to first identify the encoding units that will be covered by the privacy mask and set a low quality quantization parameter for them, and then determine quantization parameters for the encoding units outside the extended privacy mask area. Similarly, the pixels of the image may first all be grouped into encoding units and then regrouped in the extended privacy mask area, or they may be grouped in one way within the extended privacy mask area and in another way outside the extended privacy mask area.

The encoding may be performed according to any desired method, using any desired codec, as long as it possible to set quantization parameters and/or encoding unit sizes. Block based hybrid codecs, such as a 11.264, H.265, MPEG-4 Part 2, or VP9 codec, may be used for the encoding. In its most general form, the present teachings may actually be used with any encoding method, even those that are inflexible regarding quantization parameters and/or encoding unit sizes.

As described in connection with FIG. 12, the encoding system may be integrated in a camera. However, it is also possible to arrange the encoding system separately, and to operatively connect it to a camera. It is also possible to transmit images from a camera to, for example, a control center without privacy masks, and to apply privacy masks in the control center, for example, in a VMS (video management system). In such case, the encoding system may be arranged in the VMS or otherwise in the control center and used for so called transcoding, where encoded images are received from the camera, decoded, and then re-encoded, but now with the privacy mask. This may be of interest if different access rights apply to different users of the images. For instance, it may be desirable to record video sequences without privacy masks for later forensic use by the police, but a guard watching live transmissions may not be allowed to see the unmasked images.

The method may be carried out by executing instructions stored on a computer-readable storage medium. The instructions may be executed by any kind of processor, for example, a central processing unit (CPU), a graphics processing unit (GPU), a custom made processing device implemented in an integrated circuit, an ASIC, an FPGA, or logical circuitry including discrete components.

The encoding system and modules may be embodied as software, firmware, hardware, circuitry, or any combination thereof.

The camera may be any kind of camera, such as a visual light camera, an IR camera, or a thermal camera.

Additionally, variations to the disclosed embodiments can be understood and effected by the skilled person in practicing the disclosed teachings from a study of the drawings, the disclosure, and the appended claims.

What is claimed is:

1. A method of encoding a digital image comprising a privacy mask, the method comprising:
    receiving information representative of pixels in the digital image;
    grouping the pixels of the image into encoding units of groups of neighboring pixels;
    receiving information representative of a privacy mask area in which a privacy mask is to be applied on the image;
    identifying all encoding units that at least partially are located within the privacy mask area;
    extending the privacy mask area to be aligned with the identified encoding units;
    for each encoding unit, determining a respective quantization parameter to be used for encoding the image;
    applying the privacy mask in the extended privacy mask area of the image; and
    encoding the image with the applied privacy mask using the determined quantization parameters.

2. The method according to claim 1, wherein a predetermined encoding parameter is used for encoding the identified encoding units, the predetermined encoding parameter being at least one of a predetermined encoding unit size and a predetermined quantization parameter.

3. The method according to claim 1, wherein determining a respective quantization parameter to be used for encoding the image comprises setting the quantization parameters of the identified encoding units to a predetermined reduced quality quantization parameter.

4. The method according to claim 1, wherein the privacy mask comprises a pixelization in which pixels within the privacy mask area are grouped into pixelization groups of neighboring pixels, and wherein a pixel value of each pixel of a respective pixelization group is set to a common pixel value representative of the respective pixelization group, the method further comprising:
grouping the pixels of the image within the privacy mask area into encoding units corresponding to the pixelization groups.

5. The method according to claim 1, wherein determining a respective quantization parameter to be used for encoding the image comprises:
setting a quantization parameter for each encoding unit based on an identification of relevant areas in the image, such that encoding units in relevant areas are given a first quantization parameter, and encoding units in not relevant areas are given a second quantization parameter, the first quantization parameter being representative of a compression giving a higher image quality than the second quantization parameter.

6. The method according to claim 5, wherein determining a respective quantization parameter to be used for encoding the image comprises:
calculating a spatial statistical measure of the information representative of the pixels for each encoding unit to form a group value for each encoding unit;
calculating differences between group values;
comparing the differences to a threshold value;
if the difference is equal to or above the threshold value, identifying the encoding unit as being in a relevant area of the image; and
if the difference is below the threshold, identifying the encoding unit as being in a not relevant area of the image.

7. The method according to claim 6, wherein the spatial statistical measure is at least one from the group consisting of a sum, a mean, a median, an interquartile range, a standard deviation, a variance, a skewness and a kurtosis of the information.

8. The method according to claim 6, wherein each encoding unit includes at least 256 pixels.

9. The method according to claim 1, wherein the information representative of the pixels in the image is at least one from the group consisting of data on luminance, light intensity, and color values.

10. A digital image encoding system for encoding a digital image comprising a privacy mask, the system comprising:
a receiving module arranged to receive information representative of pixels in the digital image and to group the pixels of the image into encoding units of groups of neighboring pixels;
a privacy mask input module arranged to receive information representative of a privacy mask area in which a privacy mask is to be applied on the image;
an adaptation module arranged to identify all encoding units that at least partially are located within the privacy mask area and to extend the privacy mask area to be aligned with the identified coding units;
a compression determination module arranged to determine a respective quantization parameter for each encoding unit to be used for encoding the image;
a privacy mask application module arranged to apply the privacy mask in the extended privacy mask area of the image; and
an encoder module arranged to encode the image with the applied privacy mask using the determined quantization parameters.

11. The encoding system according to claim 10, wherein the privacy mask input module is arranged to receive information on a pixelization in which pixels within the privacy mask area are grouped into pixelization groups of neighboring pixels, the receiving module is arranged to group the pixels of the image within the privacy mask area into encoding units corresponding to the pixelization groups, and the privacy mask application module is arranged to set a pixel value of each pixel of a respective pixelization group to a common pixel value representative of the respective pixelization group.

12. The encoding system according to claim 10, wherein the compression determination module is arranged to set a quantization parameter for each encoding unit based on an identification of relevant areas in the image, such that encoding units in relevant areas are given a first quantization parameter, and encoding units in not relevant areas are given a second quantization parameter, the first quantization parameter being representative of a compression giving a higher image quality than the second quantization parameter.

13. The encoding system according to claim 12, wherein the compression determination module is arranged to:
calculate a spatial statistical measure of the information representative of the pixels for each encoding unit to form a group value for each encoding unit;
calculate differences between group values;
compare the differences to a threshold value;
if the difference is equal to or above the threshold value, identify the encoding unit as being in a relevant area of the image; and
if the difference is below the threshold, identify the encoding unit as being in a not relevant area of the image.

14. A camera comprising:
a digital encoding system for encoding a digital image comprising a privacy mask, the system comprising:
a receiving module arranged to receive information representative of pixels in the digital image and to group the pixels of the image into encoding units of groups of neighboring pixels;
a privacy mask input module arranged to receive information representative of a privacy mask area in which a privacy mask is to be applied on the image;
an adaptation module arranged to identify all encoding units that at least partially are located within the privacy mask area and to extend the privacy mask area to be aligned with the identified coding units;
a compression determination module arranged to determine a respective quantization parameter for each encoding unit to be used for encoding the image;
a privacy mask application module arranged to apply the privacy mask in the extended privacy mask area of the image; and
an encoder module arranged to encode the image with the applied privacy mask using the determined quantization parameters.

15. An article of manufacture including a non-transitory computer-readable storage medium having instructions stored thereon for encoding a digital image comprising a privacy mask, executing of which by a computing device causes the computing device to perform operations comprising:

receiving information representative of pixels in the digital image;

grouping the pixels of the image into encoding units of groups of neighboring pixels;

receiving information representative of a privacy mask area in which a privacy mask is to be applied on the image;

identifying all encoding units that at least partially are located within the privacy mask area;

extending the privacy mask area to be aligned with the identified encoding units;

for each encoding unit, determining a respective quantization parameter to be used for encoding the image;

applying the privacy mask in the extended privacy mask area of the image; and encoding the image with the applied privacy mask using the determined quantization parameters.

* * * * *